United States Patent
Herring (10) Patent No.: US 7,639,365 B2
(45) Date of Patent: Dec. 29, 2009

(54) CONFOCAL SCANNING HOLOGRAPHY MICROSCOPE

(75) Inventor: Rodney A. Herring, Victoria (CA)

(73) Assignee: Rodney Herring, Victoria, British Columbia (CA)

( * ) Notice: Subject to any disclaimer, the term of this patent is extended or adjusted under 35 U.S.C. 154(b) by 535 days.

(21) Appl. No.: 11/572,988

(22) PCT Filed: Jul. 22, 2005

(86) PCT No.: PCT/CA2005/001156

§ 371 (c)(1),
(2), (4) Date: Jan. 30, 2007

(87) PCT Pub. No.: WO2006/010253

PCT Pub. Date: Feb. 2, 2006

(65) Prior Publication Data

US 2007/0247630 A1    Oct. 25, 2007

(51) Int. Cl.
*G01B 9/021* (2006.01)
(52) U.S. Cl. .................................................... 356/458
(58) Field of Classification Search ............. 250/201.3, 250/201.9; 356/457, 458, 515
See application file for complete search history.

(56) References Cited

U.S. PATENT DOCUMENTS

| | | | | |
|---|---|---|---|---|
| 3,511,554 A | * | 5/1970 | Van Ligten et al. ............ 359/30 |
| 3,659,914 A | * | 5/1972 | Brooks ........................ 356/457 |
| 3,764,216 A | * | 10/1973 | Bliek et al. .................. 356/458 |
| 3,911,729 A | * | 10/1975 | Collins ......................... 73/603 |
| 4,725,142 A | * | 2/1988 | Sharnoff ...................... 356/458 |
| 5,039,223 A | * | 8/1991 | Gemma et al. ............... 356/458 |
| 5,335,062 A | * | 8/1994 | Hofmeister et al. ......... 356/457 |
| 5,563,704 A | * | 10/1996 | Fitzpatrick .................. 356/458 |
| 5,777,742 A | * | 7/1998 | Marron ........................ 356/458 |
| 6,381,023 B1 | | 4/2002 | Kempe |
| 6,469,791 B1 | * | 10/2002 | Stenton ....................... 356/458 |
| 6,496,267 B1 | | 12/2002 | Takaoka |
| 6,535,276 B2 | * | 3/2003 | Dubois ....................... 356/28.5 |
| 7,084,384 B2 | * | 8/2006 | Proksch et al. ............ 250/201.3 |
| 7,119,905 B2 | * | 10/2006 | Bingham et al. ............ 356/484 |
| 7,127,109 B1 | * | 10/2006 | Kim ............................. 382/210 |
| 7,348,528 B2 | * | 3/2008 | Marshall .................. 250/201.3 |
| 7,505,138 B2 | * | 3/2009 | Guthals et al. ............. 356/457 |
| 2006/0152732 A1 | * | 7/2006 | Roosen et al. .............. 356/458 |

FOREIGN PATENT DOCUMENTS

WO        WO 92/04594        3/1992

* cited by examiner

*Primary Examiner*—Gregory J Toatley, Jr.
*Assistant Examiner*—Scott M Richey (57) ABSTRACT

A confocal scanning holography microscope for use with a suitably selected detector for providing three dimensional information on the state of an object. The microscope has a coherent wavelength source for producing a coherent beam, scanning means for moving said coherent beam in a suitably selected pattern, and means for producing and focusing an object beam and a reference beam to an object focal point and a reference focal point, respectively. The object beam has a transmission path of essentially the same length of a transmission path of the reference beam. The object beam intercepts an object at the object focal point while the reference beam passes by the object. There are also means for defining the object beam and the reference beam based on the position of the object focal point and the geometry of the convergence angles and means for producing an interference pattern between the object focal point and the reference focal point.

52 Claims, 8 Drawing Sheets

CONFOCAL SCANNING HOLOGRAPHY MICROSCOPE

FIELD OF THE INVENTION

The present invention relates to a confocal scanning holography microscope. Additionally, this invention relates to confocal scanning holography.

BACKGROUND OF THE INVENTION

The use of beams of radiation to obtain information about an object by detecting the amplitude or phase of the beam is well known for scientific and medical purposes. For example, the phase information of a beam that passes through an object can provide information on the object's temperature, composition, magnetic field or electrostatic field, whereas amplitude measurements can provide information on the opaqueness or density of the object. The beams are comprised of waves of radiation, where a wave, $\psi$, can be described as having both an amplitude, $A$, and phase, $\phi$, described mathematically as, $$\psi = A\exp(i\phi)$$

The information obtained from the diagnostic method depends on whether it is detecting the amplitude or both the amplitude and phase of a beam's wave. If the diagnostic method measures only a beam's amplitude, as is the case for ultrasound and X-ray, only density differences in the object are reported. If the diagnostic method can detect both the amplitude and phase, it can, for example, provide information on the object's temperature, composition, strain field, magnetic or electrostatic fields. For electromagnetic radiation, i.e., light or laser beams, the phase of a beam is modified by an object's optical index, where the optical index is dependent on the object's temperature and composition. Hence, use of the above prior art limits the information that can be obtained. An additional disadvantage of a number of diagnostic imaging techniques such as Ultrasound and X-ray imaging methods is the strength of radiation employed. Levels employed may have the potential to damage cells in the body.

Examples of an application where the measurement of temperature and/or composition is important include studies aimed at understanding of heat and mass transfer in physical systems. Presently researchers have to resort to computer simulations of the physical system, using unknown and assumed parameters, and never knowing if their models are correct.

Confocal scanning laser microscopes were developed in the 1980s for seeing three-dimensional objects. Confocal scanning laser microscopy uses a laser beam passing through an object to create a three-dimensional amplitude image of the object by detecting the amplitude of the beam through a pinhole aperture placed confocal with a point on a focal plane of the object.

Confocal microscopes have now found widespread applications in the materials, biological, and medical sciences. As a diagnostic tool, confocal microscopes are limited to detecting only the density differences of objects, which produce amplitude differences of the detected beam. They do not measure the object's phase information. Hence, confocal microscopes cannot measure an object's composition or temperature.

Standard holography microscopes have been used to measure both the phase and the amplitude of objects, giving important information of objects such as their density, composition and temperature. Holography microscopes create a three dimensional amplitude image and phase image of the object by measuring both the phase and the amplitude. However, the three dimensional information measured from holography microscopes conies only from the surface of the object and not at points within the object.

The concept of marrying the two techniques of confocal scanning laser microscopy and holography microscopy to overcome the above deficiency was proposed in "Confocal Scanning Laser Holography, and an associated microscope: a proposal", R. A. Herring, Optik 105, No. 2, 1997, p. 65-68. This technique, termed confocal holography microscopy, was proposed to enable the measurement of both phase and amplitude of a beam at any point inside or on the surface of an object. The information about an object that is generated by a confocal holography microscope was postulated to provide three-dimensional information on the state of the object, both on the surface and the inside, in a non-invasive manner. However, the confocal holography microscope proposed by R. A. Herring was unable to provide any of the above information as it was impossible to form three-dimensional information on the state of an object.

Accordingly, it is an object of the present invention to overcome the deficiencies of the prior art.

SUMMARY OF THE INVENTION

A confocal holography (CH) microscope for obtaining holograms from points on the surfaces and inside transparent objects is provided for the three dimensional measurement of the amplitudes and phases of a beam passing through, or reflected from, an object. The CH microscope has a dual pinhole (PH) aperture in the optical system placed confocal to a point in the object. The PH aperture allows an object beam and a reference beam to interfere on an observation plane where a hologram is formed and recorded. The convergence angle of the beam onto the object and the pinhole aperture defines the three-dimensional volume of the object being measured. Each hologram is equivalent to an equation, containing the amplitude and phase information of the beam having interacted with the part of the object given by the convergence angle of the beam onto the object and the pin hole aperture. "N" number of holograms of the object are taken by the CH microscope and they are used to solve for "N" number of three-dimensional points describing the three-dimensional object. From the phase information obtained from the holograms, the optical index of the object can be determined for each point describing the three dimensional object. The optical index of the object can be used to determine the object's absolute state, such as its absolute temperature or absolute composition.

In one embodiment of the invention, a confocal scanning holography microscope for use with a suitably selected detector and a suitably selected wavelength source, for providing three dimensional information on the state of an object is provided. The microscope has scanning means for moving said coherent beam in a suitably selected pattern, and means for producing and focusing an object beam and a reference beam to an object focal point and a reference focal point, respectively. The object beam has a transmission path of essentially the same length of a transmission path of the reference beam. The object beam intercepts an object at the object focal point while the reference beam passes by the object. There are also means for defining the object beam and the reference beam based on the position of the object focal point and the geometry of the convergence angles and means for producing an interference pattern between the object focal point and the reference focal point.

In one aspect of the invention, the means for producing and focusing said coherent beam comprises means for splitting said coherent beam into said object beam and said reference beam and means for focusing said object beam and said reference beam.

In another aspect of the invention, the means for splitting said coherent beam is a biprism.

In another aspect of the invention the means for focusing said object beam and said reference beam comprises a lens objective imaging system.

In another aspect of the invention the lens objective imaging system comprises at least one lens and at least one biprism.

In another aspect of the invention the microscope further comprises a spatial filter and beam expander to produce a collimated beam from the coherent beam prior to splitting said beam.

In another aspect of the invention the microscope further comprises a first lens for stopping divergence of said collimated beam prior to splitting said beam.

In another aspect of the invention the scanning means comprises at least one of a beam rastering system, means to shift said object, means to shift the lens objective imaging system and means to shift said means for defining the object beam and the reference beam.

In another aspect of the invention the means to shift the object is a first translation stage.

In another aspect of the invention the means to shift said means for defining the object beam and the reference beam is a third translation plate.

In another aspect of the invention the means to shift the lens objective imaging system is a second translation plate.

In another aspect of the invention the rastering system is a pair of rotating mirrors.

In another aspect of the invention the means for defining the object beam and the reference beam based on the geometry of said convergence angle and said position of said object focal point and said reference focal point is confocal with said first object focal point and said first reference focal point.

In another aspect of the invention the means for defining the object beam and the reference beam based on the geometry of said convergence angle and said position of said object focal point and said reference focal point comprises a plate defining a double pinhole aperture for limiting passage of said object and said reference beam therethrough.

In another aspect of the invention the means for producing an interference pattern between said object focal point and said reference focal point comprises means for collecting said first object focal point and said first reference focal point after said first object focal point and after said first reference focal point and means for focusing said collected object and reference beams to a second object focal point and a second reference focal point at the double pin hole aperture.

In another aspect of the invention the means for collecting comprises at least one lens and said means for focusing comprises at least one lens.

In another aspect of the invention the microscope further comprises directing means.

In another aspect of the invention the directing means comprises at least two mirrors.

In another aspect of the invention the one mirror is a partially reflecting mirror for directing said object beam and said reference beam to a detector.

In another aspect of the invention the at least one mirror is a reflecting mirror and is for intercepting said first reference focal point and reflecting said reference beam.

In another aspect of the invention the microscope further comprises a beam splitter for splitting said reference beam and said object beam into an object beam, a reflected object beam, a reference beam and a reflected reference beam In another aspect of the invention the at least three reflecting mirrors are placed to accept beams passing through said lens objective imaging system and beams reflected off of said beam splitter.

In another aspect of the invention the microscope further comprises at least three lenses, each placed after said at least three mirrors in a lens, mirror configuration.

In another aspect of the invention the microscope further comprises a half wave plate to polarize said object and reference beams according to a direction of transmission and an analyzer for filtering polarized object and reference beams to permit passage to a detector.

In another embodiment of the invention, a confocal scanning holography microscope for use with a suitably selected detector for providing three dimensional information on the state of an object is provided. The microscope has a coherent wavelength source for producing a coherent beam, scanning means for moving said coherent beam in a suitably selected pattern, and means for producing and focusing an object beam and a reference beam to an object focal point and a reference focal point, respectively. The object beam has a transmission path of essentially the same length of a transmission path of the reference beam. The object beam intercepts an object at the object focal point while the reference beam passes by the object. There are also means for defining the object beam and the reference beam based on the position of the object focal point and the geometry of the convergence angles and means for producing an interference pattern between the object focal point and the reference focal point.

In one aspect of the invention, the means for producing and focusing said coherent beam comprises means for splitting said coherent beam into said object beam and said reference beam and means for focusing said object beam and said reference beam.

In another aspect of the invention, the means for splitting said coherent beam is a biprism.

In another aspect of the invention the means for focusing said object beam and said reference beam is comprises a lens objective imaging system.

In another aspect of the invention the lens objective imaging system comprises at least one lens and at least one biprism.

In another aspect of the invention the microscope further comprises a spatial filter and beam expander to produce a collimated beam from the coherent beam prior to splitting said beam.

In another aspect of the invention the microscope further comprises a first lens for stopping divergence of said collimated beam prior to splitting said beam.

In another aspect of the invention the scanning means comprises at least one of a beam rastering system, means to shift said object, means to shift the lens objective imaging system and means to shift said means for defining the object beam and the reference beam.

In another aspect of the invention the means to shift the object is a first translation stage.

In another aspect of the invention the means to shift said means for defining the object beam and the reference beam is a third translation plate.

In another aspect of the invention the means to shift the lens objective imaging system is a second translation plate.

In another aspect of the invention the rastering system is a pair of rotating mirrors.

In another aspect of the invention the means for defining the object beam and the reference beam based on the geometry of said convergence angle and said position of said object focal point and said reference focal point is confocal with said first object focal point and said first reference focal point.

In another aspect of the invention the means for defining the object beam and the reference beam based on the geometry of said convergence angle and said position of said object focal point and said reference focal point comprises a plate defining a double pin hole aperture for limiting passage of said object and said reference beam there through.

In another aspect of the invention the means for producing an interference pattern between said object focal point and said reference focal point comprises means for collecting said first object focal point and said first reference focal point after said first object focal point and after said first reference focal point and means for focusing said collected object and reference beams to a second object focal point and a second reference focal point at the double pin hole aperture.

In another aspect of the invention the means for collecting comprises at least one lens and said means for focusing comprises at least one lens.

In another aspect of the invention the microscope further comprises directing means.

In another aspect of the invention the directing means comprises at least two mirrors.

In another aspect of the invention the one mirror is a partially reflecting mirror for directing said object beam and said reference beam to a detector.

In another aspect of the invention the at least one mirror is a reflecting mirror and is for intercepting said first reference focal point and reflecting said reference beam.

In another aspect of the invention the microscope further comprises a beam splitter for splitting said reference beam and said object beam into an object beam, a reflected object beam, a reference beam and a reflected reference beam In another aspect of the invention the at least three reflecting mirrors are placed to accept beams passing through said lens objective imaging system and beams reflected off of said beam splitter.

In another aspect of the invention the microscope further comprises at least three lenses, each placed after said at least three mirrors in a lens, mirror configuration.

In another aspect of the invention the microscope further comprises a half wave plate to polarize said object and reference beams according to a direction of transmission and an analyzer for filtering polarized object and reference beams to permit passage to a detector.

In another aspect of the invention, the coherent wavelength source is a coherent light source.

In another aspect of the invention, the coherent light source is a laser.

In another embodiment of the invention, a method for providing three dimensional information on an object comprising diverging a coherent beam from a coherent wavelength source, rastering the beam, splitting the beam into an object beam and a reference beam, focusing the resultant two beams, ensuring the length of the two beams are essentially equivalent, intercepting an object with said object beam at an object focal point, avoiding the object with the reference beam while having a reference focal point on the same plane as the object focal point, refocusing the two beams to second focal points that are confocal with the first focal points, limiting the beams and forming an interference pattern for detecting is provided.

In other representative examples, a confocal scanning holography microscope comprises a scanner configured to receive and scan an optical beam and a beam shaping optical system. The beam shaping optical system is configured to produce and focus to an object focal point and a reference focal point, respectively, at a selected convergence angle, an object beam and a reference beam. An optical detection system is configured to receive the object beam and the reference beam and produce an interference of the object beam and the reference beam based on at least one optical property of the object.

In another aspect of the invention, the method further comprises intercepting and reflecting said reference beam at said reference beam focal point, reflecting said object beam off the object before refocusing said beams.

BRIEF DESCRIPTION OF THE DRAWINGS

The present invention will be described in conjunction with the drawings in which.

DETAILED DESCRIPTION

Figure 1:
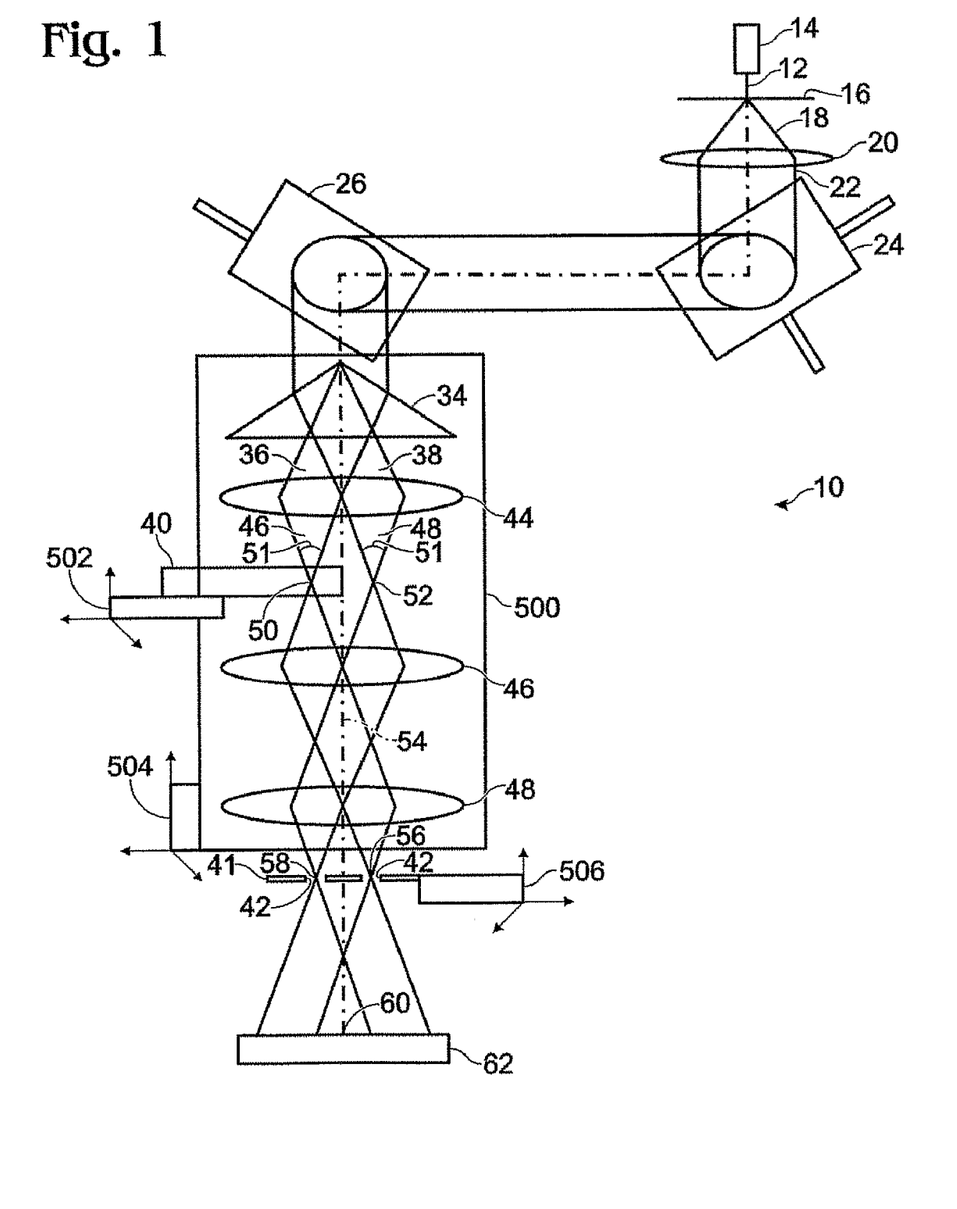
FIG. 1 is a transmission confocal scanning laser microscope in accordance with a first embodiment of the invention.

FIG. 1 shows an illustration of a transmission confocal holography microscope 10 according to a first embodiment of the present invention. A beam 12 is emitted from a coherent radiation source such as a laser 14. The laser beam 12 passes through a spatial filter/beam expander 16 that causes the beam 12 to diverge to form a diverging laser beam 18 having an increasingly larger cross sectional area. The diverging beam 18 passes through a lens 20 that stops the divergence and produces a collimated beam 22 with a larger cross sectional area that the original beam 12.

The collimated beam 22 is moved by a beam rastering system composed of a first rotating mirror 24 and a second rotating mirror 26. The beam rastering system is for moving the beam in the x, y direction on the focused plane and in the z or axial direction in an object 40.

The collimated beam 22 then passes through a biprism 34, where the beam 22 is split into two beams 36 and 38. One of these beams is an object beam 36 used to scan an object 40 while the other beam is a reference beam 38 that interferes with the object beam 36 after a plate 41 having a double pin hole aperture 42 to produce a holographic image by techniques known in the art.

The two beams 36 and 38 exit the biprism 34 and enter a lens objective imaging system 500 composed of a second lens 44, a third lens 46 and a fourth lens 48. The second lens 44 and the third lens 46 form a symmetrical lens system with the object 40. The lens system focuses the object beam 36 onto the object 40 and focuses the reference beam 38 after passing by the object 40 onto the double pin hole aperture 42.

The beams 36, 38 are focused by the second lens 44 to object and reference probes 46, 48. The object probe 46 from the object beam 36 passes through the object 40 and the reference probe 48 from the reference beam 38 passes to the side of the object 40. The object probe 46 is focused at a selected convergence angle 51 to a first object focal point 50 in the object 40. In the case of the reference probe 48, a first reference focal point 52 is in the same plane as the first object focal point 50 for the object probe 46 in the object 40 but is not in the object 40 itself and is the result of focusing the reference beam 38 at a selected convergence angle 51.

The observed first object focal point 50 in the object 40 is moved by movement of the object and reference beams 36, 38 via double pin hole apertures 42 or lens 44, 46, 48 along the optical axis 54. Both probes 46, 48 diverge after the first object focal point 50 and first reference focal point 52 and are refocused into a second object focal point 56 and a second reference focal point 58 at the double pin hole aperture 42 by the fourth lens 48.

The object beam 36 focuses at a first object focal point 50 in the object 40 that is to be scanned and passes through the object 40 after the second lens 44. Thus, as the object beam 36 enters the third lens 46 it has scanned the object 40 for the three-dimensional state information to be obtained.

The second object focal point 56 after the fourth lens 48 is coincident with the plate 41 having the double pin hole aperture 42. The double pin hole aperture 42 limits the observation of the state of the object 40 to a point. That is, light from the second object focal point 56 in the object 40 passes through the aperture 42 while light from other points is rejected. One of the pin hole apertures 42 is used for the object beam 36 while the other is used for the reference beam 38. That is, the apertures 42 and a position in the object 40 where the first object focal point 50 are confocal, as a line or a plane, depending on the shape of the aperture 42.

Apertures 42 having a slot-shape allow a beam in the shape of a line to pass through while rejecting part of a beam that are not line-shaped. Thus the apertures 42 and the first object focal point 50 in the object 40 would be confocal in a line. Apertures 42 having a round shape will change the observed first object focal point 50 to a two-dimensional plane.

After the beams 36, 38 focused at the double pin hole aperture 42 have passed through, they diverge such that the reference beam 38 interferes with the object beam 36 forming an interference pattern 60 on a charge couple device detector 62. The information in this interference pattern 60 is representative of the state of the object 40 at the first object focal point 50. The interference pattern 60 from these beams 36, 38 is detected by the detector 62 and forms the state information for the object 40 at the first object focal point 50. Three-dimensional information is determined by obtaining state information from different points in the object 40. The resulting hologram is analyzed to determine its amplitude and phase according to techniques known in the art. An amplitude and phase image is then produced by the summation of all the position dependent amplitude and phase measurements.

Movement of the focused plane within the object 40 along the optical axis 54 may be performed by movement of the object 40 along the optical axis 54, movement of the plate 41 with a double pin hole 42 along the optical axis 54 or movement of a beam focusing system 34, 44, 46, 48 along the optical axis 54.

Figure 2:
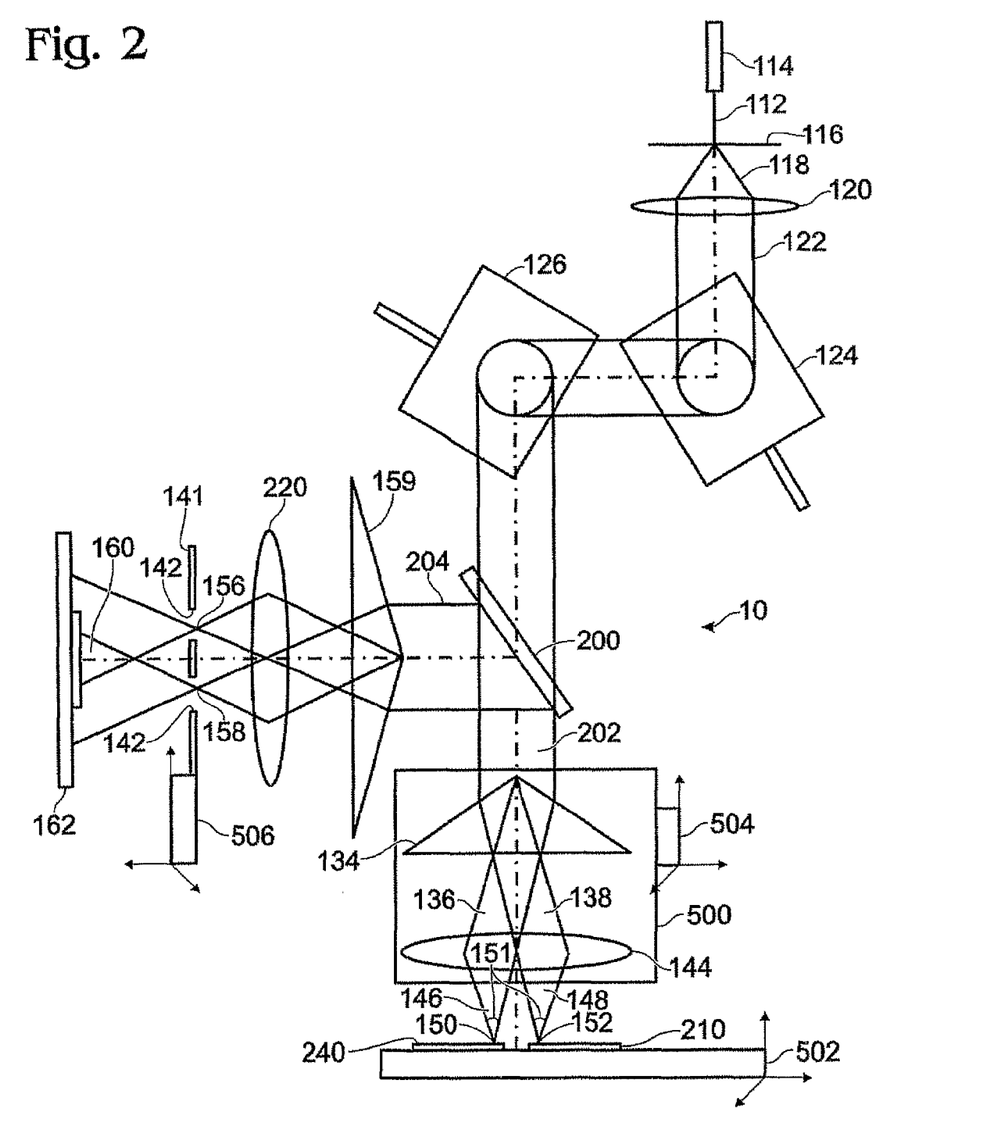
FIG. 2 is a reflection confocal scanning laser microscope in accordance with a second embodiment of the invention.

FIG. 2 shows an illustration of a confocal holography microscope 110 according to a second embodiment of the present invention. As with the microscope 10 of the first embodiment, a beam 112 from a coherent light source 114 passes through a spatial filter/beam splitter 116 where the beam 112 diverges to forming a diverging beam 118. A first lens 120 stops this divergence and forms a collimated beam 122 having a larger cross sectional area than the original beam 112.

The collimated beam 122 is moved by a beam rastering system composed of a first rotating mirror 124 and a second rotating mirror 126. The beam rastering system is for moving the beam in the x, y direction on the focused plane and in the z or axial direction in an object 240.

The collimated beam 122 then passes through a partially reflecting mirror 200 producing a first 202 and a second 204 beam. The first and second beams 202, 204 of the collimated beam 122 travel perpendicular to each other, with the first beam 202 traveling straight through on the path of the original collimating beam 122, and the second beam 204 traveling at a 90° angle to the path of the original collimating beam 122. 122, and the second beam 204 traveling at a 90° angle to the path of the original collimating beam 122.

The first beam 202 then enters a first biprism 134 and is split to form two beams 136, 138. One of these beams is an object beam 136 used to scan the object 240 while the other beam is a reference beam 138 that interferes with the object beam 136 after a double pin hole aperture 142 to produce a holographic image by techniques well known in the art.

The beams 136, 138 are focused by a second lens 144 to object and reference probes 146, 148. The object probe 146 from the object beam 136 passes through the object 240 and the reference probe 148 from the reference beam 138 passes to the side of the object 240.

The object probe 146 is focused at a selected convergence angle 151 to a first object focal point 150 in the object 240. In the case of the reference probe 148, a first reference focal point 152 is in the same plane as the first object focal point 150 for the object probe 146 in the object 240 but onto a reference beam mirror 210 and is the result of focusing the reference beam 138 at a selected convergence angle 151. The reference beam mirror 210 reflects the reference beam 138 back through the second lens 144 and first biprism 134 to the partially reflecting mirror 200 where the beam is directed to a second biprism 159. Similarly, the object beam 136 is reflected back from the object 240 through the second lens 144 and first biprism 134 to the partially reflecting mirror 200 where the beam is directed to a second biprism 159. The second lens 144 refocuses the beams 136, 138. The first biprism 134 recombines the beams 136, 138 and deflects them to the partially reflecting mirror 200.

The second biprism 159 deflects the beams 136, 138 to a projection lens 220 that focuses the two beams 136, 138 to focal points 156, 158. The second object focal point 156 after the projection lens 220 is coincident with a plate 141 having the double pin hole aperture 142. The double pin hole aperture 142 limits the observation of the state of the object 240 to a point. That is, light from the second object focal point 156 in the object 140 passes through the aperture 142 while light from other points is rejected. One of the pin hole apertures 142 is used for the object beam 136 while the other is used for the reference beam 138. That is, the apertures After the beams 136, 138 focused at the double pin hole aperture 142 have passed through, they diverge such that the reference beam 138 interferes with the object beam 136 forming an interference pattern 160 on a charge couple device detector 162. The information in this interference pattern 160 is representative of the state of the object at the first object focal point 150. The interference pattern 160 from these beams 136, 138 is detected by the detector 162 and forms the state information for the abject 240 at the first object focal point 150. Three-dimensional information is determined by obtaining state information from different points in the object 240. The resulting hologram is analyzed to determine its amplitude and phase according to techniques known in the art. An amplitude and phase image is then produced by the summation of all the position dependent amplitude and phase measurements.

Combination Transmission and Reflection Confocal Scanning Microscope

Figure 3:
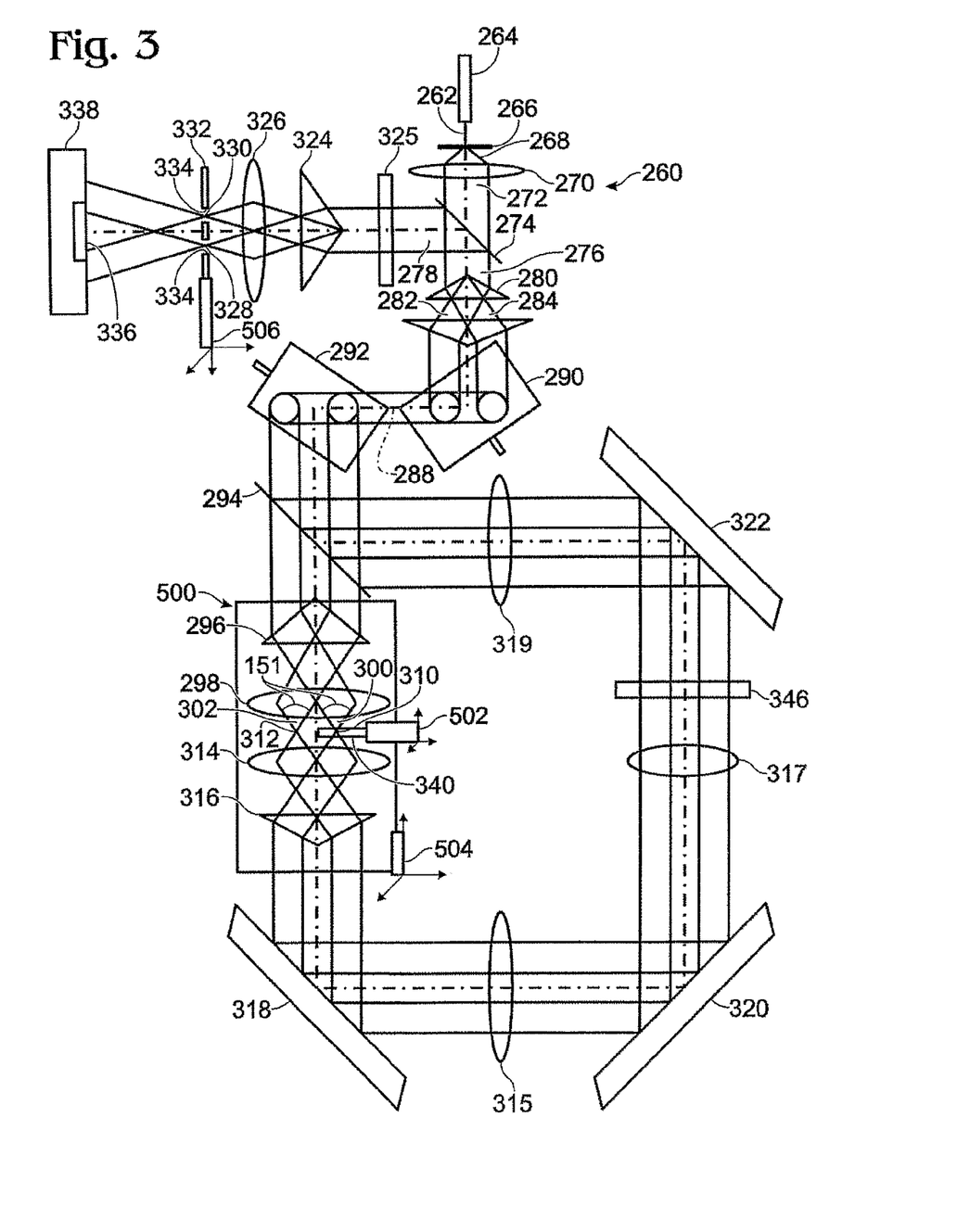
FIG. 3 is a combination transmission reflection confocal scanning laser microscope in accordance with a third embodiment of the invention.

Transmission Mode:

FIG. 3 shows an illustration of a combination transmission and reflection confocal holography microscope 260 according to a third embodiment of the present invention. As with the microscope 10 of the first embodiment, a beam 262 from a coherent light source 264 passes through a spatial filter/beam splitter 266 where the beam 262 diverges to forming a diverging beam 268. A first lens 270 stops this divergence and forms a collimated beam 272 having a larger cross sectional area than the original beam 262.

Part of the collimated beam 272 passes through a partially reflecting mirror 274 forming a first beam 276, while another part of the collimating beam 272 is reflected forming a second beam 278. The two beams travel perpendicular to each other, with the first beam 276 traveling straight through on the path of the original beam 272, and the second beam 278 traveling at a 90° angle to the path of the original beam 272.

The first beam 272 then enters a first biprism 280 and is split to form two beams 282, 284. One of these beams is an object beam 282 used to scan the object The first beam 272 then enters a first biprism 280 and is split to form two beams 282, 284. One of these beams is an object beam 282 used to scan the object 340 while the other beam is a reference beam 284 that interferes with the object beam 282. The beams, 282, 284 then enter a second biprism 286 that straightens the beams 282, 284 parallel to the optical axis 288. The beams 282, 284 are then moved by a beam rastering system composed of a first rotating mirror 290 and a second rotating mirror 292. The beam rastering system is for moving the beam in the x, y direction on the focused plane and in the z or axial direction in an object 340. The beams 282, 284 then interact with a beam splitter 294 that allows part of the two beams 282, 284 to pass through the beam splitter 294 and reflects part of the beams 382, 384 to the side of the beam splitter 294.

The beams 282, 284 then enter a third biprism 296. The beams 282, 284 are focused by a second lens 298 to probes 300, 302. The object probe 300 from the object beam 282 passes through the object 340 and the reference probe 302 from the reference beam 284 passes to the side of the object 340.

The object beam 282 is focused at a selected convergence angle 151 to a first object focal point 310 in the object 340. In the case of the reference beam 284, a first reference focal point 312 is in the same plane as the first object focal point 310 but is not in the object 340 itself and is the result of focusing the reference beam 284 at a selected convergence angle 151.

The object beam 282 and the reference beam 284 then pass through an objective lens 314 that refocuses the beams 282, 284 onto a fourth biprism 316. The fourth biprism 316 redirects the object beam 282 and the reference beam 284 to be parallel to the optical axis 288. The beams 282, 284 are reflected off a third, fourth and fifth mirror 318, 320, 322, passing through a fourth lens 315, a fifth lens 317 and a sixth lens 319 located after each mirror respectively. The three lenses 315, 317 and 319 compensate for any beam walk or any redirection of the two beams 282, 284 caused by rastering. Additionally, to distinguish reflected beams 382, 384 from the object and reference beams 282, 284, a half-wave plate 346 is placed between the fifth lens 317 and the fifth mirror 322. The half-wave plate 346 rotates the polarization of the object and reference beams 282, 284 by 90 degrees. The reflected beams 382, 384 are not rotated since the top reflected beam is not rotated at all and the bottom reflected beam is rotated twice with the second rotation compensating for the first rotation.

The beams 282, 284 are reflected by the beam splitter 294 to the rastering system comprising the first rotating mirror 290 and the second rotating mirror 292, through the second biprism 286 and the first biprism 280 to the partially reflecting mirror 274. An analyzer 325 is placed before a fifth biprism 324. The analyzer 325 permits selection of either the object and reference beams 282, 284 or the reflected beams 382, 384 by rotating the analyzer 325 by 90 degrees ($\pm \lambda/2$).

The object beam 282 and the reference beam 284 pass through the fifth biprism 324. The fifth biprism 324 separates the beams 282, 284 and redirects them to a projection lens 326 that focuses the two beams 282, 284 to focal points 328, 330. The second object focal point 328 after the projection lens 326 is coincident with a plate 332 having the double pin hole aperture 334. The double pin hole aperture 334 limits the observation of the state of the object 340 to a point. That is, light from the second object focal point 328 in the object 340 passes through the aperture 334 while light from other points is rejected. One of the pin hole apertures 334 is used for the object beam 282 while the other is used for the reference beam 284. That is, the apertures 334, the apertures 334 and a position in the object 340 are confocal, as a line or a plane, depending on the shape of the aperture 334.

After the beams 282, 284 focused at the double pin hole aperture 326 have passed through, they diverge such that the reference beam 284 interferes with the object beam 282 forming an interference pattern 336 on a charge coupled device detector 338. The information in this interference pattern 336 is representative of the state of the object 340 at the first object focal point 310. The interference pattern 336 from these beams 282, 284 is detected by the detector 330 and forms the state information for the object 340 at the first object focal point 310. Three-dimensional information is determined by obtaining state information from different points in the object 340. The resulting hologram is analyzed to determine its amplitude and phase according to techniques known in the art. An amplitude and phase image is then produced by the summation of all the position dependent amplitude and phase measurements.

Figure 4:
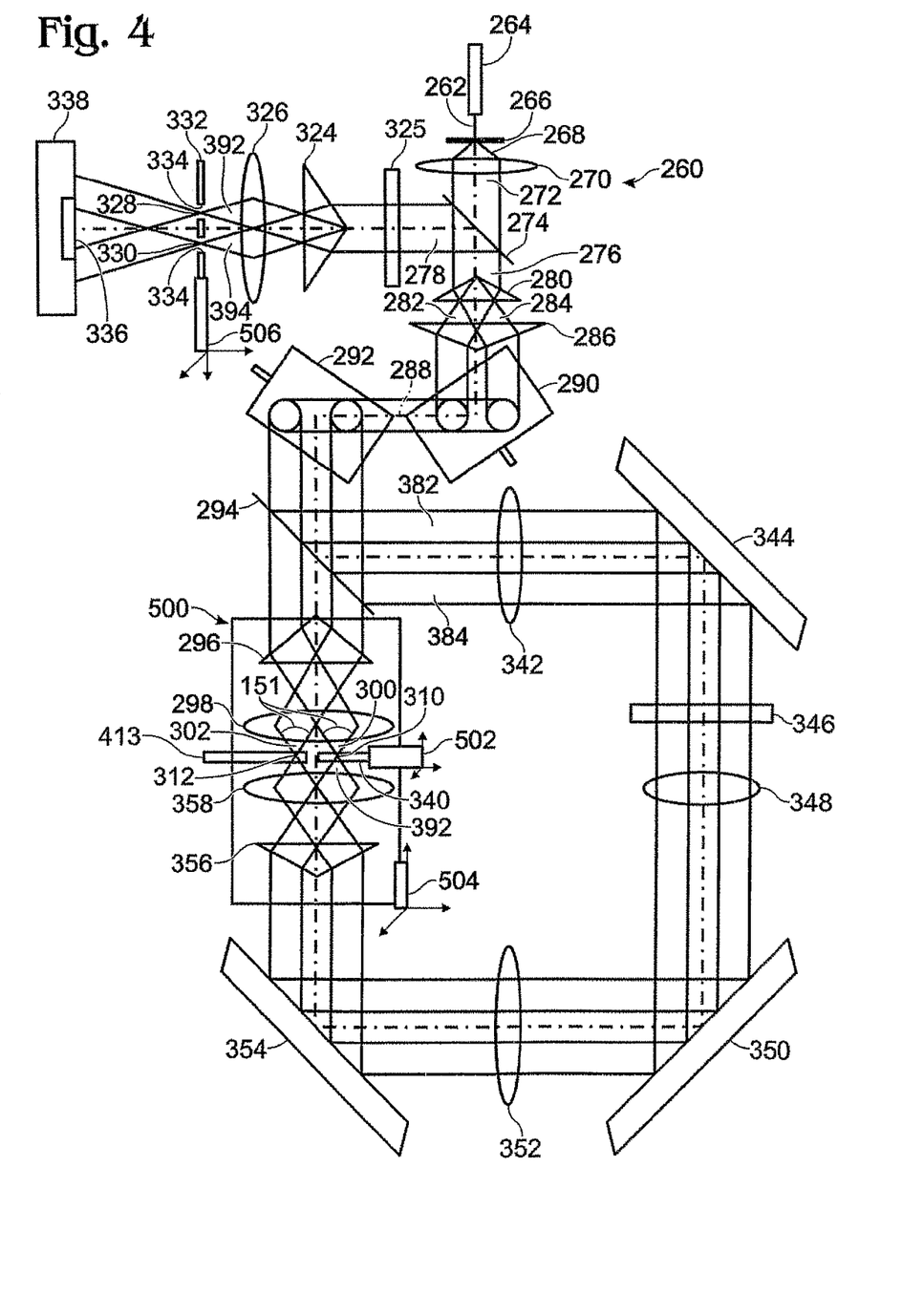
FIG. 4 is a combination transmission reflection confocal scanning laser microscope in accordance with a fourth embodiment of the invention.
Figure 5:
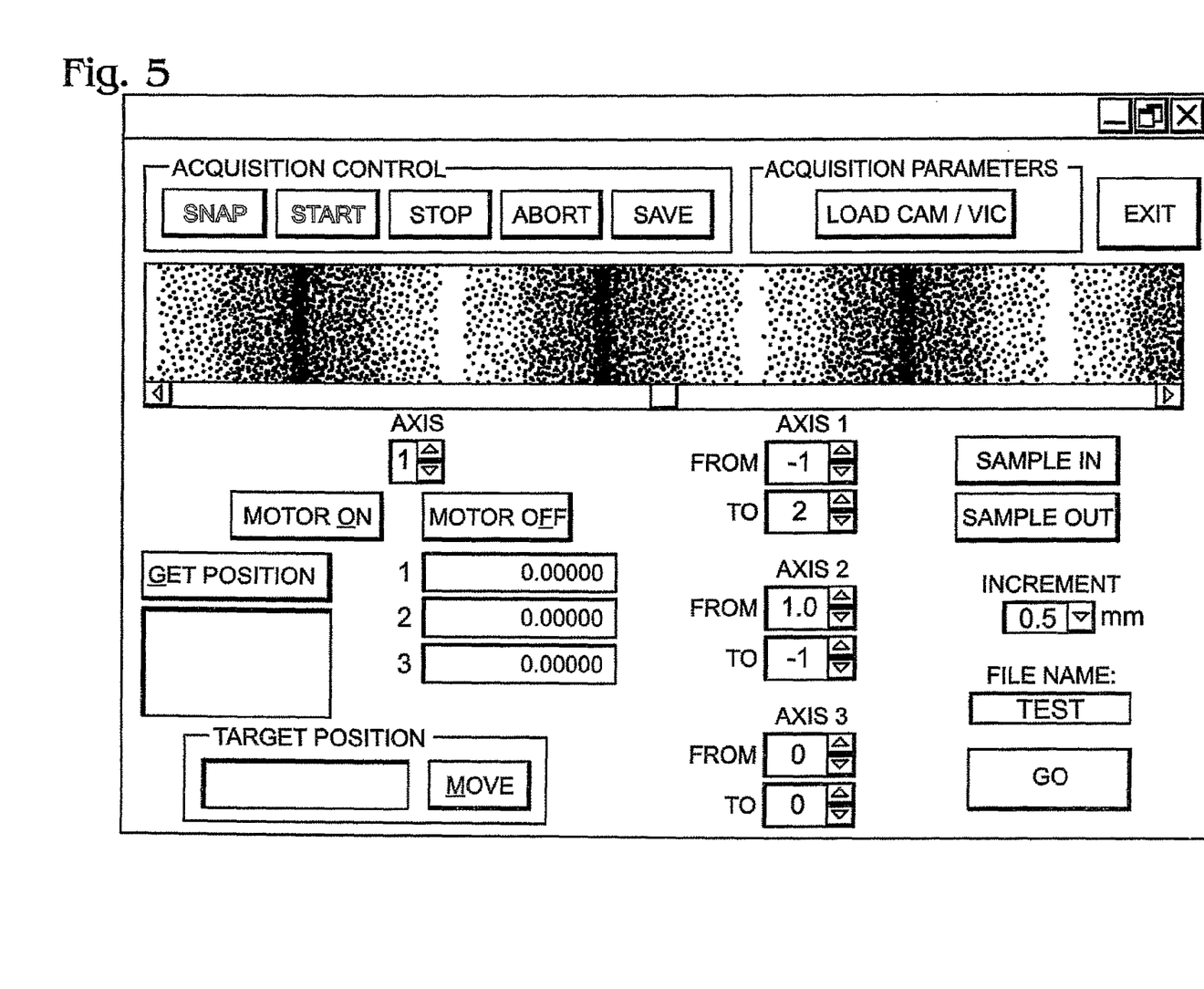
FIG. 5 is a hologram produced by a transmission confocal scanning holography microscope in accordance with the first embodiment of the invention.
Figure 6:
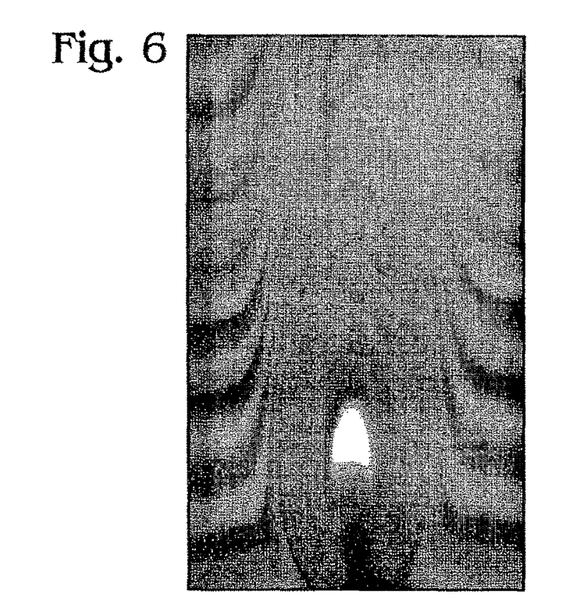
FIG. 6 is a hologram of a candle with a flame.
Figure 7:
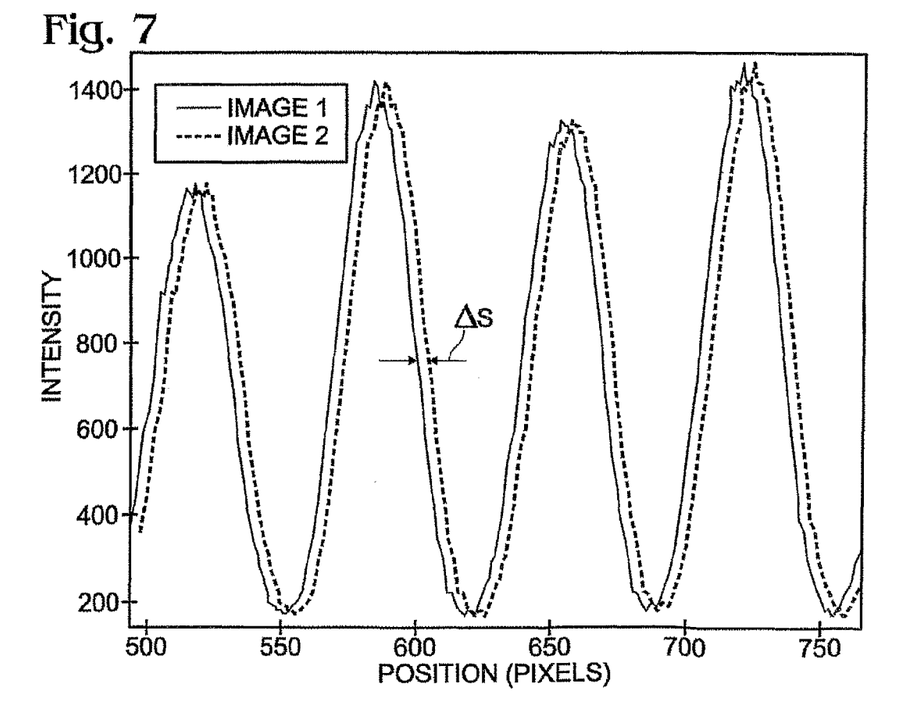
FIG. 7 is a shift in the fringes of the hologram presented in FIG. 5 when passing the Laser beam through the flame presented in FIG. 6. The fringe shift was used to measure the refractive index change when passing though the flame.
Figure 8:
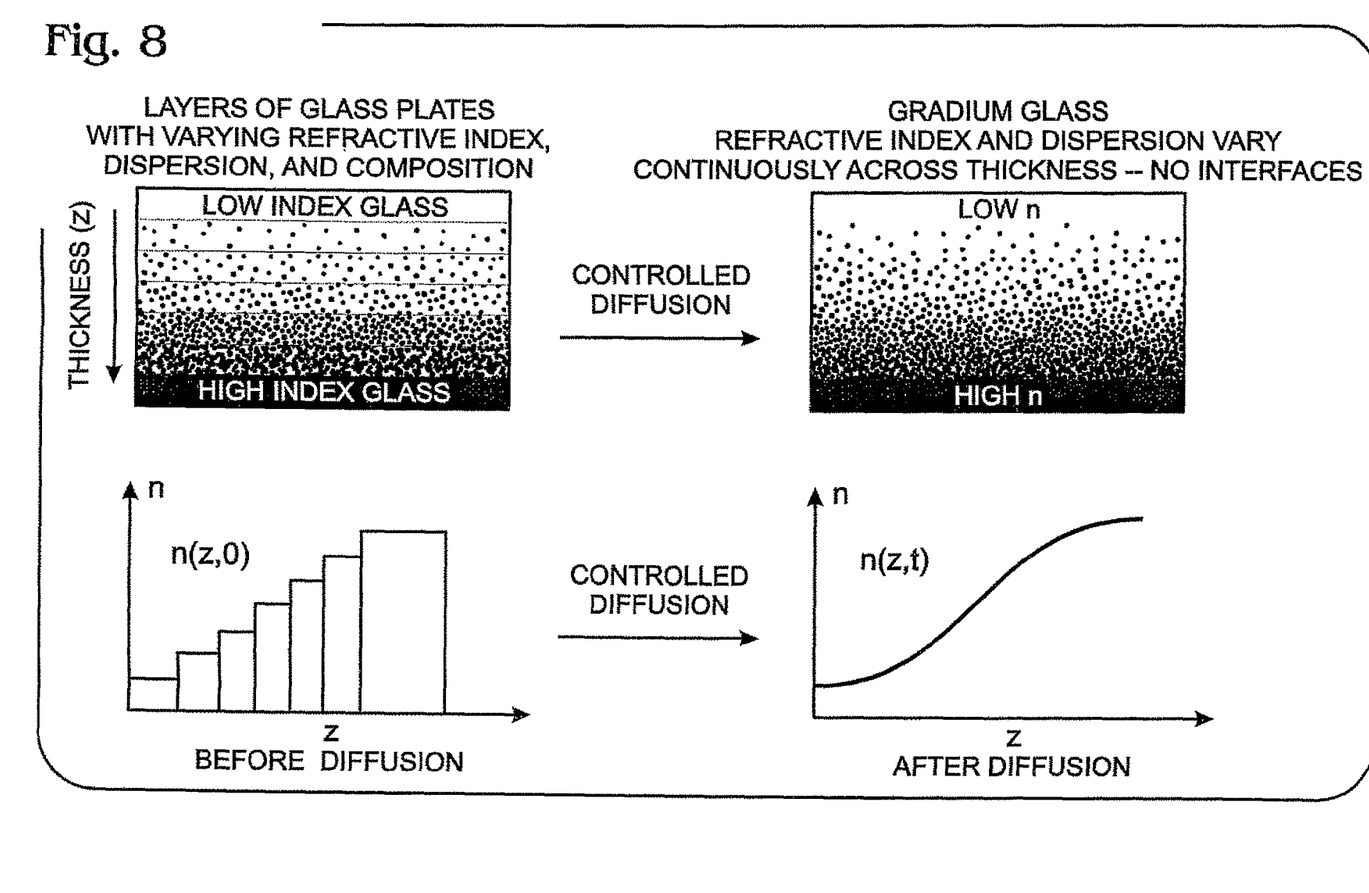
FIG. 8 is a refractive index glass having a variation in the through-thickness of its refractive index.
Figure 9:
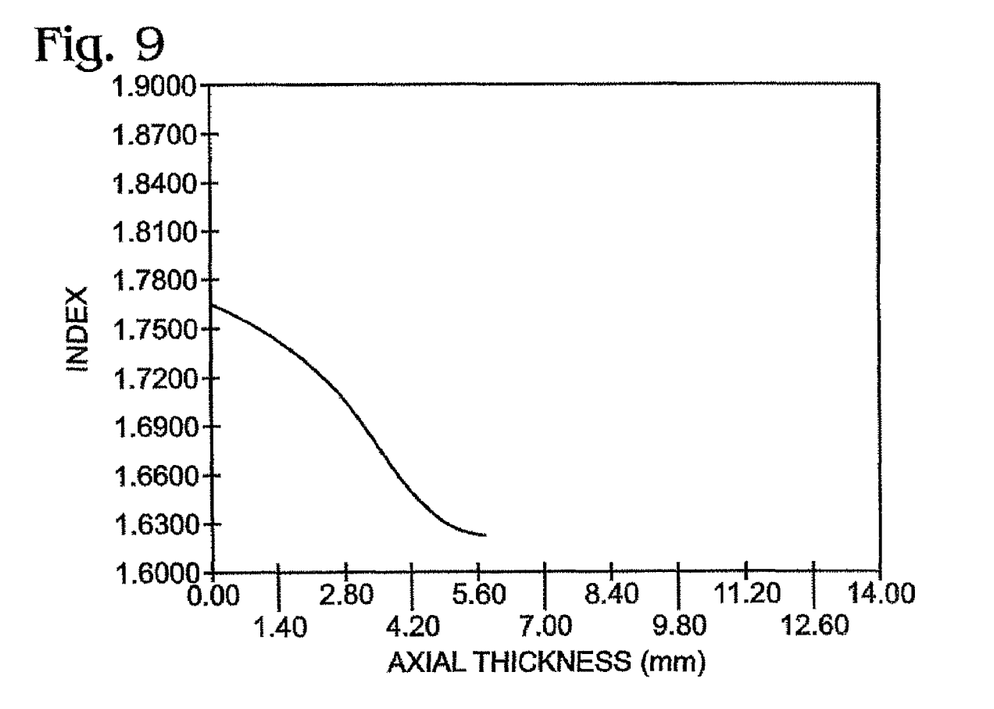
FIG. 9 is a measure of the through-thickness change in refractive index by the confocal scanning holography microscope of the present invention.

FIG. 4 shows an illustration of a combination transmission and reflection confocal holography microscope 260 according to a fourth embodiment of the present invention. As with the microscope 10 of the first embodiment, a beam 262 from a coherent light source 264 passes through a spatial filter/beam splitter 266 where the beam diverges to forming a diverging beam 268. A first lens 270 stops this divergence and forms a collimated beam 272 having a larger cross sectional area than the original beam 262.

Part of the collimated beam 272 passes through a partially reflecting mirror 274 forming a first beam 276, while another part of the collimating beam 272 is reflected forming a second beam 278. The two beams travel perpendicular to each other, with the first beam 276 traveling straight through on the path of the original beam 272, and the second beam 278 traveling at a 90° angle to the path of the original beam 272.

The first beam 272 then enters a first biprism 280 and is split to form two beams 282, 284. One of these beams is an object beam 282 used to scan the object 286 while the other beam is a reference beam 284 that interferes with the object beam 282. The beams, 282, 284 then enter a second biprism 286 that straightens the beams 282, 284 parallel to the optical axis 288. The beams 282, 284 are then moved by a beam rastering system composed of a first rotating mirror 290 and a second rotating mirror 292. The beam rastering system is for moving the beam in the x, y direction on the focused plane and in the z or axial direction in an object 340. The beams 282, 284 then interact with a beam splitter 294 that allows part of the two beams 282, 284 to pass through the beam splitter 294 and reflects part of the beams 382, 384 to the side of the beam splitter 294.

The beams 282, 284 then enter a third biprism 296. The beams 282, 284 are focused by a second lens 298 to probes 300, 302. The object probe 300 from the object beam 282 is reflected off the object 340, back to the second lens 298 and the reference probe 302 from the reference beam 284 passes to the side of the object 340. The object beam 282 is focused at a selected convergence angle 151 at a first object focal point 310 in the object 340. In the case of the reference beam 284, the first reference focal point 312 is in the same plane as the first object focal point 310 and is on a reference beam mirror 313. The reference beam 284 is also focused a selected convergence angle. The reference beam 284 reflects off the reference beam mirror 313 back to the second lens 298. The second lens 298 focuses the reference beam 284 onto the third biprism 296. The third biprism 296 redirects the reference beam 284 and the object beam 282 parallel to the optical axis 288.

The beams 282, 284 are reflected by the beam splitter 294 to the rastering system comprising a first rotating mirror 290 and a second rotating mirror 292, through the second biprism 286 and the first biprism 280 to the partially reflecting mirror 274. An analyzer 325 is placed before a fifth biprism 324. The analyzer 325 permits selection of either the object and reference beams 282, 284 or the second object and reflected reference beams 382, 384 by rotating the analyzer 325 by 90 degrees (±λ/2).

The object beam 282 and the reference beam 284 pass through the fifth biprism 324. The fifth biprism 324 separates the beams and redirects them to a projection lens 326 that focuses the two beams 282, 284 to second object and second reference focal points 328, 330. The second object focal point 328 after the projection lens 326 is coincident with a plate 332 having the double pin hole aperture 334. The double pin hole aperture 334 limits the observation of the state of the object 340 to a point. That is, light from the second object focal point 328 in the object 340 passes through the aperture 334 while light from other points is rejected. One of the pin hole apertures 334 is used for the object beam 282 while the other is used for the reference beam 284. That is, the apertures 334 and a position in the object 340 are confocal, as a line or a plane, depending on the shape of the aperture 334.

After the beams 282, 284 focused at the double pin hole aperture 334 have passed through, they diverge such that the reference beam 284 interferes with the object beam 282 forming an interference pattern 336 on a charge couple device detector 338. The information in this interference pattern 336 is representative of the state of the object at the first object focal point 310. The interference pattern 336 from these beams 282, 284 is detected by the detector 338 and forms the state information for the object 340 at the first object focal point 310. Three-dimensional information is determined by obtaining state information from different points in the object 340. The resulting hologram is analyzed to determine its amplitude and phase according to techniques known in the art. An amplitude and phase image is then produced by the summation of all the position dependent amplitude and phase measurements.

The reflected beams, forming the reflected object beam and the reflected reference beam 382, 384 that are reflected from the beam splitter 296 are pass through a sixth lens 342, are reflected off a fifth mirror 344, then pass through a half-wave plate 346 before passing through the fifth lens 348. The beams 382, 384 are reflected off a fourth mirror 350, pass through the fourth lens 352 and are then reflected off the third mirror 354. The three lens 342, 344 and 346 compensate for any beam walk or any redirection of the two beams 382, 384 caused by rastering. The half-wave plate 346 is placed between the fifth lens 348 and the fifth mirror 344 to distinguish reflected beams 382, 384 from the object and reference beams 282, 284. The half-wave plate 346 rotates the polarization of the object and reference beams 282, 284 by 90 degrees. The reflected beams 382,384 are not rotated since the top reflected beam is not rotated at all and the bottom reflected beam is rotated twice with the second rotation compensating for the first rotation.

The two beams 382, 384 enter the fourth biprism 356 and are redirected to the third lens 358 that focuses the beams 382, 384. One beam, the reflected object beam 382, is focused to a second object probe 392 on the object 340 and the other beam, the reflected reference beam 384, is focused to a second reference probe 394 and passes to the side of the object 340. The second reference probe is focused on a second reference mirror 413 and reflects back to the third lens 358.

The fourth biprism 356 redirects the object beam 382 and the reflected reference beam 384 to be parallel to the optical axis 288. The beams, 382, 384 are reflected off a third, fourth and fifth mirror 354, 350, 344, passing through a fourth lens 352, a fifth lens 348 and a sixth lens 342 located after each mirror respectively. The three lens 352, 348 and 342 compensate for any beam walk or any redirection of the two beams 282, 284 caused by mastering. Additionally, to distinguish reflected beams 382, 384 from the object and reference beams 282, 284, a half-wave plate 346 is placed between the fifth lens 348 and the fifth mirror 344. The half-wave plate 346 rotates the polarization of the reflected object and reflected reference beams 382, 384 by 90 degrees. The reflected beams 382, 384 are not rotated since the top reflected beam is not rotated at all and the bottom reflected beam is rotated twice with the second rotation compensating for the first rotation.

The beams 382, 384 are reflected by the beam splitter 294 to the rastering system comprising a first rotating mirror 290 and a second rotating mirror 292, through the second biprism 286 and the first biprism 280 to the partially reflecting mirror 274. An analyzer 325 is placed before a fifth biprism 324. The analyzer 325 permits selection of either the object and reference beams 282, 284 or the reflected beams 382, 384 by rotating the analyzer 325 by 90 degrees (±λ/2).

The reflected object beam 382 and the reflected reference beam 384 pass through the fifth biprism 324. The fifth biprism 324 separates the beams and redirects them to a projection lens 326 that focuses the two beams 382, 384 to focal points 328, 330. The second object focal point 328 after the projection lens 326 is coincident with a plate 332 having the double pin hole aperture 334. The double pin hole aperture 334 limits the observation of the state of the object 340 to a point. That is, light from the second object focal point 328 in the object 340 passes through the aperture 334 while light from other points is rejected. One of the pin hole apertures 334 is used for the reflected object beam 382 while the other is used for the reflected reference beam 284. That is, the apertures 334, and a position in the object 340 are confocal, as a line or a plane, depending on the shape of the aperture 334.

After the beams 382, 384 focused at the double pin hole aperture 334 have passed through, they diverge such that the reflected reference beam 384 interferes with the reflected object beam 382 forming an interference pattern 336 on a charge couple device detector 338. The information in this interference pattern 336 is representative of the state of the object at the first object focal point 310. The interference pattern 336 from these beams 382, 384 is detected by the detector 338 and forms the state information for the object 340 at the first object focal point 310. Three-dimensional information is determined by obtaining state information from different points in the object 340. The resulting hologram is analyzed to determine its amplitude and phase according to techniques known in the art. An amplitude and phase image is then produced by the summation of all the position dependent amplitude and phase measurements.

Overall:

In each embodiment the separation between the object beam and the reference beam is controlled by a second biprism. The degree to which the beams are separated depends on the distance between the first and second biprisms.

In each embodiment, a lens objective imaging system 500 is symmetrically disposed around the object that is to be imaged. This symmetrical arrangement reduces optical distortions in the beams. In those embodiments having a lens above and a lens below the object, the object is equidistant from both lenses. To provide a truly symmetric lens system the second lens and the third lens are of an equal strength.

Beam Scanning:

In order for the entire object to be observed, all of the focused probe positions of the Laser beam impinging the object should be made confocal with the pin hole aperture. Scanning of the object is achieved by either shifting the object, shifting the optics or by shifting the PH aperture or a combination of any of these three shifting methods. The following beam scanning methods apply to the embodiments of the invention, except where indicated.

The object is scanned three dimensionally by shifting the object three dimensionally using a first translation stage 502 with all of the components of the microscope being held fixed.

Alternatively, the object is scanned in the x-direction by the rotating mirror, in the y-direction by the rotating mirror and in the z-direction (optic axis) by shifting either a second translation stage 504, which houses a platform where the biprisms and the objective lenses are placed, or alternatively the pin hole translation stage 506. In addition, for the microscope of the first embodiment only (FIG. 1), the scanning of the object in the x,y plane by the rotating mirrors and movement of the second translation stage 504 in the z plane, shifts the beam at the plane of the pin hole aperture, which is compensated by shifting the phi hole aperture three-dimensionally using the pin hole translation stage 506 in order for the focused probe position of the beam in the object to remain confocal with the pin hole. In the third and fourth embodiments of the invention (FIGS. 3 and 4) scanning of the object in the x,y plane by the rotating mirrors does not shift the beam at the plane of the pin hole aperture so that the object can remain stationary and the only moving parts during the three dimensional scanning of the object are the first rotating mirror, the second rotating mirror and the pin hole aperture to moving the beam in the x, y, and z axes, respectively. This method is useful for experiments being performed where the object does not want to be disturbed (moved), such as space experiments in microgravity.

Double Pin Hole Aperture:

The double pin hole aperture has one pinhole for the object beam and one pinhole for the reference beam, i.e., one pinhole is placed confocal to the focused probe position in the object and the other pinhole is placed confocal to the focused probe position of the reference beam, which passes to the side of the object. The pinholes are used to reject any part of a beam that is divergent from the paths of the object and reference beams and to accurately define the beam geometry such as its convergence angle and focal length. The PH aperture allows the object beam and reference beam to form a hologram on the CCD detector.

Spatial Resolution:

The spatial resolution is set by either the probe size of the beam being focused on the object or by the pinhole size of the pin hole aperture, whichever is more restrictive and still enabling sufficient intensity of the beam to pass through the optical system to form a hologram. The object is always out-of-focus and is only observed in-focus upon combining all of the amplitudes and phases of the points defining the object in proper registry.

EXAMPLE 1

In objects comprising of plasma, gases, liquids, and solids, there are many unanswered questions to simple states of matter, such as the temperature and the composition existing at interfaces between immiscible and miscible fluids, a container and its contents, and within fluids having various states, such as within a simple flame burning fuel during combustion. The use of this CH microscope will answer many of these questions. As well, CH microscopy can be used in diagnostics method to non-intrusively observe the variations in temperature within the body such as at the interfaces between body organs and their surroundings. Since infrared radiation and acoustic waves (ultrasound) easily pass through the body, and they can be precisely focused and be made highly coherent, they can be used by the CH microscope in order to see the body's internal structure, and to measure its composition and temperature. Once the internal body can be seen by the CH microscope, by varying the intensity and dwell time of the beam, operations to help cure sickness becomes possible, using beam heating methods. As well, since a CH microscope focuses the beam to a probe, which is passed quickly over a point, it can be very gentle on the body by giving a low radiation dose.

EXAMPLE 2

Because the CH microscope employs a holography method, it measures the "absolute" phase information of the object, which is advantageous for precise measurements of fundamental physical phenomena, and which is also advantageous for performing a high-level, quantitative study. As well, because electromagnetic radiation sources, such as electrons, Lasers and acoustics, can now be obtained having very good beam coherence, amplitude and phase images of large objects are possible, on the order of many centimeters. It will be possible with the development of new optical focusing material to be able to observe much larger objects in the future.

EXAMPLE 3

Since modern lasers have very good beam coherence, the amplitude and phase images of large objects are possible with the confocal holography microscope, on the order of many centimeters. With the development of larger optical components for focusing larger beams, such as the infrared beams, the microscope may be used to observe even larger objects.

Further examples are provided by way of FIGS. 5-9.

It will be apparent to one skilled in the art that numerous modifications and departures from the specific embodiments described herein may be made without departing from the spirit and scope of the invention. Variations include different types of beam splitters, different beam rastering systems, and different beam directors. Modifiers such as optical fibres, fibre beam guides and holographic diffusers could also be used.

The invention claimed is:

1. A confocal scanning holography microscope for use with a suitably selected coherent wavelength source, for the production of a coherent beam, and a suitably selected detector for providing three dimensional information on an object, said microscope comprising:
    scanning means for moving said coherent beam in a suitably selected pattern;
    means for producing and focusing at a suitably selected convergence angle, an object beam and a reference beam to an object focal point and a reference focal point, respectively, at a suitably selected position said object beam having a transmission path of essentially the same length of a transmission path of said reference beam, said object beam intercepting an object at the object focal point and said reference beam passing by the object;
    means for defining the object beam and the reference beam based on the geometry of said convergence angle and said position of said object focal point and said reference focal point; and
    means for producing an interference pattern between said object focal point and said reference focal point,
    such that in use, information is collected about an object by a detector.

2. The microscope of claim 1 wherein said means for producing and focusing said coherent beam comprises means for splitting said coherent beam into said object beam and said reference beam and means for focusing said object beam and said reference beam.

3. The microscope of claim 2 wherein said means for splitting said coherent beam is a biprism.

4. The microscope of claim 3 wherein said means for focusing said object beam and said reference beam is comprises a lens objective imaging system.

5. The microscope of claim 4 wherein said lens objective imaging system comprises at least one lens and at least one biprism.

6. The microscope of claim 5 further comprising a spatial filter and beam expander to produce a collimated beam from the coherent beam prior to splitting said beam.

7. The microscope of claim 6 further comprising a first lens for stopping divergence of said collimated beam prior to splitting said beam.

8. The microscope of claim 6 wherein said scanning means comprises at least one of a beam rastering system, means to shift said object, means to shift the lens objective imaging system and means to shift said means for defining the object beam and the reference beam.

9. The microscope of claim 8 wherein said means to shift said object is a first translation stage.

10. The microscope of claim 9 herein said means to shift said means for defining the object beam and the reference beam is a third translation plate.

11. The microscope of claim 10 wherein said means to shift the lens objective imaging system is a second translation plate.

12. The microscope of claim 11 wherein said rastering system is a pair of rotating mirrors.

13. The microscope of claim 12 wherein said means for defining the object beam and the reference beam based on the geometry of said convergence angle and said position of said object focal point and said reference focal point is confocal with said first object focal point and said first reference focal point.

14. The microscope of claim 13 wherein said means for defining the object beam and the reference beam based on the geometry of said convergence angle and said position of said object focal point and said reference focal point comprises a plate defining a double pin hole aperture for limiting passage of said object and said reference beam therethrough.

15. The microscope of claim 14 wherein said means for producing an interference pattern between said object focal point and said reference focal point comprising means for collecting said first object focal point and said first reference focal point after said first object focal point and after said first reference focal point and means for focusing said collected object and reference beams to a second object focal point and a second reference focal point at the double pin hole aperture.

16. The microscope of claim 15 wherein said means for collecting comprises at least one lens and said means for focusing comprises at least one lens.

17. The microscope of claim 16 further comprising directing means.

18. The microscope of claim 17 wherein said directing means comprises at least two mirrors.

19. The microscope of claim 18 wherein one mirror is a partially reflecting mirror for directing said object beam and said reference beam to a detector.

20. The microscope of claim 19 wherein at least one mirror is a reflecting mirror and is for intercepting said first reference focal point and reflecting said reference beam.

21. The microscope of claim 20 further comprising a beam splitter for splitting said reference beam and said object beam into an object beam, a reflected object beam, a reference beam and a reflected reference beam.

22. The microscope of claim 21 wherein at least three reflecting mirrors are placed to accept beams passing through said lens objective imaging system and beams reflected off of said beam splitter.

23. The microscope of claim 22 further comprising at least three lenses, each placed after said at least three mirrors in a lens, mirror configuration.

24. The microscope of claim 23 further comprising a half wave plate to polarize said object and reference beams according to a direction of transmission and an analyzer for filtering polarized object and reference beams to permit passage to a detector.

25. A confocal scanning holography microscope for use with a suitably selected detector for providing three dimensional information on an object, said microscope comprising:

a coherent wavelength source for producing a coherent beam;

scanning means for moving said coherent beam in a suitably selected pattern;

means for producing, and focusing at a suitably selected convergence angle, an object beam and a reference beam to an object focal point and a reference focal point, respectively, at a suitably selected position said object beam having a transmission path of essentially the same length of a transmission path of said reference beam, said object beam intercepting an object at the object focal point and said reference beam passing by the object, means for defining the object beam and the reference beam based on the geometry of said convergence angle and said position of said object focal point and said reference focal point;

means for producing an interference pattern between said object focal point and said reference focal point, and such that in use, information is collected about an object by a detector.

26. The microscope of claim 25 wherein said means for producing and focusing said coherent beam comprises means for splitting said coherent beam into said object beam and said reference beam and means for focusing said object beam and said reference beam.

27. The microscope of claim 26 wherein said means for splitting said coherent beam is a biprism.

28. The microscope of claim 27 wherein said means for focusing said object beam and said reference beam is comprises a lens objective imaging system.

29. The microscope of claim 28 wherein said lens objective imaging system comprises at least one lens and at least one biprism.

30. The microscope of claim 29 further comprising a spatial filter and beam expander to produce a collimated beam from the coherent beam prior to splitting said beam.

31. The microscope of claim 30 further comprising a first lens for stopping divergence of said collimated beam prior to splitting said beam.

32. The microscope of claim 30 wherein said scanning means comprises at least one of a beam rastering system, means to shift said object, means to shift the lens objective imaging system and means to shift said means for defining the object beam and the reference beam.

33. The microscope of claim 32 wherein said means to shift said object is a first translation stage.

34. The microscope of claim 33 herein said means to shift said means for defining the object beam and the reference beam is a third translation plate.

35. The microscope of claim 34 wherein said means to shift the lens objective imaging system is a second translation plate.

36. The microscope of claim 35 wherein said rastering system is a pair of rotating mirrors.

37. The microscope of claim 36 wherein said means for defining the object beam and the reference beam based on the geometry of said convergence angle and said position of said object focal point and said reference focal point is confocal with said first object focal point and said first reference focal point.

38. The microscope of claim 37 wherein said means for defining the object beam and the reference beam based on the geometry of said convergence angle and said position of said object focal point and said reference focal point comprises a plate defining a double pin hole aperture for limiting passage of said object and said reference beam therethrough.

39. The microscope of claim 38 wherein said means for producing an interference pattern between said object focal point and said reference focal point comprising means for collecting said first object focal point and said first reference focal point after said first object focal point and after said first reference focal point and means for focusing said collected object and reference beams to a second object focal point and a second reference focal point at the double pin hole aperture.

40. The microscope of claim 39 wherein said means for collecting comprises at least one lens and said means for focusing comprises at least one lens.

41. The microscope of claim 40 further comprising directing means.

42. The microscope of claim 41 wherein said directing means comprises at least two mirrors.

43. The microscope of claim 42 wherein one mirror is a partially reflecting mirror for directing said object beam and said reference beam to a detector.

44. The microscope of claim 43 wherein at least one mirror is a reflecting mirror and is for intercepting said first reference focal point and reflecting said reference beam.

45. The microscope of claim 44 further comprising a beam splitter for splitting said reference beam and said object beam into an object beam, a reflected object beam, a reference beam and a reflected reference beam.

46. The microscope of claim 45 wherein at least three reflecting mirrors are placed to accept beams passing through said lens objective imaging system and beams reflected off of said beam splitter.

47. The microscope of claim 46 further comprising at least three lens, each placed after said at least three mirrors in a lens, mirror configuration.

48. The microscope of claim 47 further comprising a half wave plate to polarize said object and reference beams according to a direction of transmission and an analyzer for filtering polarized object and reference beams to permit passage to a detector.

49. The microscope of claim 48 wherein said coherent wavelength source is a coherent light source.

50. The microscope of claim 49 wherein said coherent light source is a laser.

51. A method for providing three dimensional information on an object comprising diverging a coherent beam from a coherent wavelength source, rastering the beam, splitting the beam into an object beam and a reference beam, focusing the resultant two beams, ensuring the length of the two beams are essentially equivalent, intercepting an object with said object beam at an object focal point, avoiding the object with the reference beam while having a reference focal point on the same plane as the object focal point, refocusing the two beams to second focal points that are confocal with the first focal points, limiting the beams and forming an interference pattern for detecting.

52. The method of claim 51 further comprising intercepting and reflecting said reference beam at said reference beam focal point, reflecting said object beam off the object before refocusing said beams.

* * * * *